United States Patent
Umehara et al.

(10) Patent No.: US 11,546,962 B2
(45) Date of Patent: Jan. 3, 2023

(54) MOBILE COMMUNICATION SYSTEM, TERMINAL DEVICE, BASE STATION DEVICE, COMMUNICATION METHOD, AND COMPUTER PROGRAM

(71) Applicant: KDDI CORPORATION, Tokyo (JP)

(72) Inventors: Masahito Umehara, Tokyo (JP); Issei Kanno, Tokyo (JP); Takeo Ohseki, Tokyo (JP); Yasuhiro Suegara, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 35 days.

(21) Appl. No.: 17/265,912

(22) PCT Filed: Jul. 10, 2019

(86) PCT No.: PCT/JP2019/027396
§ 371 (c)(1),
(2) Date: Feb. 4, 2021

(87) PCT Pub. No.: WO2020/031606
PCT Pub. Date: Feb. 13, 2020

(65) Prior Publication Data
US 2021/0204353 A1  Jul. 1, 2021

(30) Foreign Application Priority Data
Aug. 9, 2018  (JP) .............................. JP2018-150200

(51) Int. Cl.
*H04W 76/27* (2018.01)

(52) U.S. Cl.
CPC ................................. *H04W 76/27* (2018.02)

(58) Field of Classification Search
CPC ..... H04W 76/27; H04W 76/22; H04W 52/146
See application file for complete search history.

(56) References Cited

U.S. PATENT DOCUMENTS

2020/0229111 A1*  7/2020  Kim ...................... H04W 76/27

FOREIGN PATENT DOCUMENTS

WO  WO-2018084592 A1 *  5/2018  ........... H04L 5/0055

OTHER PUBLICATIONS

"3rd Generation Partnership Project; Technical Specification Group Radio Access Network; Study on Non-Orthogonal Multiple Access (NOMA) for NR", 3GPP TR 38.812 v0.0.1, Feb. 2018, 9 pages.

(Continued)

*Primary Examiner* — Farid Seyedvosoghi
(74) *Attorney, Agent, or Firm* — Foley & Lardner LLP (57) ABSTRACT

A base station device transmits a control signal for causing a transition from an RRC_CONNECTED state to an RRC_INACTIVE state and including connection parameter information to a terminal device. The terminal device performs uplink transmission to the base station device using the connection parameter information included in the control signal in the RRC_INACTIVE state to which the RRC_CONNECTED state has transitioned. The base station device performs uplink reception from the terminal device that is in the RRC_INACTIVE state to which the RRC_CONNECTED state has transitioned using the connection parameter information included in the control signal.

7 Claims, 6 Drawing Sheets

(56) References Cited

OTHER PUBLICATIONS

Samsung, "On RRC message for transition into RRC_Idle and RRC_Inactive", 3GPP TSG-RAN WG2 #101 bis, R2-1804868, 2018, 4 pages.
Vivo, "RRC Connection Release Issues for UE in RRC_Inactive", 3GPP TSG-RAN WG2 Meeting #101 bis, R2-1804597, 2018, 5 pages.
KDDI, "Discussion on procedures related to NOMA", 3GPP TSG RAN WG1 Meeting #93, R1-1807222, 2018, 3 pages.
KDDI, "Discussion on procedures related to NOMA", 3GPP TSG RAN WG1 Meeting #94bis, R1-1811486, 2018, 6 pages.
International Search Report issued in corresponding application No. PCT/JP2019/027396 dated Aug. 13, 2019 with English translation.
Nokia, Nokia Shanghai Bell,"RRC release and inactivation", 3GPP TSG-RAN2 Meeting #101 R2-1805618, Apr. 2018, 3 pages.
Office Action issued in corresponding Japanese Patent Application No. 2018-150200 dated Jun. 15, 2021 with English translation.
Huawei et al: "State transition between RRC Connected and Inactive", 3GPP Draft; R2-1706723 State Transition Between RRC Connected and Inactive, vol. RAN WG2, no. Qingdao, China; Jun. 27, 2017-Jun. 29, 2017, Jun. 17, 2017 (Jun. 17, 2017), XP051307092, Retrieved from the Internet: U'RL:http://www.3gpp.org/ftp/tsg_ran/WG2_RL2/TSGR2 AHs/2017_06_NR/Docs/ [retrieved on Jun. 17, 2017].
International Search Report, European Application No. 19846758.1 dated Mar. 31, 2022.

\* cited by examiner

MOBILE COMMUNICATION SYSTEM, TERMINAL DEVICE, BASE STATION DEVICE, COMMUNICATION METHOD, AND COMPUTER PROGRAM

TECHNICAL FIELD

The present invention relates to a mobile communication system, a terminal device, a base station device, a communication method, and a computer program.

Priority is claimed on Japanese Patent Application No. 2018-150200, filed Aug. 9, 2018, the content of which is incorporated herein by reference.

BACKGROUND ART

Conventionally, as mobile communication systems, a mobile communication system (an LTE system) called Long Term Evolution (LTE) that is under review in the 3rd Generation Partnership Project (3 GPP), a 5th-generation mobile communication system (5G system), and the like are known.

In an LTE system and a 5G system, as states of a Radio Resource Control (RRC) protocol of a terminal device, there are an RRC_CONNECTED state and an RRC_IDLE state. The RRC_CONNECTED state is a state formed when a radio connection is established. The RRC_IDLE state is a state formed at the time of waiting.

In New Radio (NR), as a state of the RRC protocol of a terminal device, an RRC_INACTIVE state is newly added. The RRC_INACTIVE state is a state formed at the time of waiting in a state in which information (User Equipment (UE) context) used for a terminal device to communicate with a core network is stored in a last-connected base station (last serving cell). Details of reviews of uplink transmission technologies enabling a terminal device, which is in the RRC_INACTIVE state, to transmit a signal to a base station device are described, for example, in Non-Patent Document 1.

CITATION LIST

Non Patent Document

[Non-Patent Document 1]
3GPP TR 38.812 v0. 0.1, February 2018

SUMMARY OF INVENTION

Problems to be Solved by the Invention

However, in the details of reviews of the uplink transmission technologies described in Non-Patent Document 1 described above, it is unclear how connection parameter information used when a terminal device, which in the RRC_INACTIVE state, transmits a signal to a base station device is acquired by the terminal device. For this reason, a terminal device that is in the RRC_INACTIVE state cannot transmit a signal to a base station device.

The present invention is realized in view of such situations, and an object thereof is to enable a terminal device that is in the RRC_INACTIVE state to perform uplink transmission to a base station device.

Means for Solving the Problems (1) According to one aspect of the present invention, a mobile communication system is provided including: a base station device; and a terminal device configured to perform radio communication with the base station device, in which the base station device adds connection parameter information to a control signal for causing a transition from an RRC_CONNECTED state to an RRC_INACTIVE state and transmits the control signal including the connection parameter information to the terminal device, the terminal device performs uplink transmission to the base station device using the connection parameter information included in the control signal in the RRC_INACTIVE state to which the RRC_CONNECTED state has transitioned in a case in which the control signal has been received, and the base station device performs uplink reception from the terminal device that is in the RRC_INACTIVE state to which the RRC_CONNECTED state has transitioned using the connection parameter information included in the control signal.

(2) According to one aspect of the present invention, a mobile communication system is provided including: a base station device; and a terminal device configured to perform radio communication with the base station device, in which the base station device transmits a control signal for causing a transition from an RRC_CONNECTED state to an RRC_INACTIVE state to the terminal device, the terminal device performs the uplink transmission to the base station device using connection parameter information of the uplink transmission to the base station device in the RRC_CONNECTED state in the RRC_INACTIVE state to which the RRC_CONNECTED state has transitioned in a case in which the control signal has been received, and the base station device performs the uplink reception from the terminal device that is in the RRC_INACTIVE state, to which the RRC_CONNECTED state has transitioned, using connection parameter information of the uplink reception from the terminal device in the RRC_CONNECTED state.

(3) In the mobile communication system described in (2) above, the control signal may include connection parameter information use information that indicates whether or not the connection parameter information of the RRC_CONNECTED state is to be used. When the connection parameter information use information of the control signal indicates that the connection parameter information of the RRC_CONNECTED state is to be used in a case in which the control signal has been received, the terminal device may perform the uplink transmission to the base station device using the connection parameter information of the uplink transmission to the base station device in the RRC_CONNECTED state in the RRC_INACTIVE state to which the RRC_CONNECTED state has transitioned. In a case in which the connection parameter information use information of the control signal transmitted to the terminal device indicates that the connection parameter information of the RRC_CONNECTED state is to be used, the base station device may perform the uplink reception from the terminal device that is in the RRC_INACTIVE state to which the RRC_CONNECTED state has transitioned using the connection parameter information of the uplink reception from the terminal device in the RRC_CONNECTED state.

(4) In the mobile communication system described in (2), when a bearer in which a specific QoS is set is established between the terminal device and a core network in a case in which the control signal has been received, the terminal device may perform uplink transmission to the base station device using the connection parameter information of the uplink transmission to the base station device in the RRC_CONNECTED state in the RRC_INACTIVE state to which the RRC_CONNECTED state has transitioned. In a case in which the bearer is established between the terminal device and the core network, the base station device may perform uplink reception from the terminal device in the RRC_INACTIVE state to which the RRC_CONNECTED state has transitioned using the connection parameter information of the uplink reception from the terminal device in the RRC_CONNECTED state.

(5) In the mobile communication system of one of (1) to (4) described above, in the RRC_CONNECTED state to which the RRC_INACTIVE state has transitioned, the terminal device may perform uplink transmission to the base station device using the connection parameter information of the uplink transmission to the base station device in the RRC_INACTIVE state. The base station device may perform uplink reception from the terminal device that is in the RRC_CONNECTED state to which the RRC_INACTIVE state has transitioned using the connection parameter information of the uplink reception from the terminal device in the RRC_INACTIVE state.

(6) In the mobile communication system of one of (1) to (5) described above, in the RRC_INACTIVE state, the terminal device may adjust a transmission power value of the connection parameter information used for the uplink transmission to the base station device on the basis of a signal received from the base station device.

(7) According to one aspect of the present invention, a terminal device of a mobile communication system is provided including a base station device and the terminal device performing radio communication with the base station device, the terminal device including: a radio communication unit configured to perform uplink transmission to the base station device using connection parameter information included in a control signal in an RRC_INACTIVE state to which an RRC_CONNECTED state has transitioned in a case in which the control signal that is a control signal causing a transition from the RRC_CONNECTED state to the RRC_INACTIVE state and includes the connection parameter information has been received from the base station device.

(8) According to one aspect of the present invention, a base station device of a mobile communication system is provided including the base station device and a terminal device performing radio communication with the base station device, the base station device including: a radio communication unit configured to transmit a control signal causing a transition from an RRC_CONNECTED state to an RRC_INACTIVE state and including connection parameter information to the terminal device and perform uplink reception from the terminal device that is in the RRC_INACTIVE state to which the RRC_CONNECTED state has transitioned using the connection parameter information included in the control signal.

(9) According to one aspect of the present invention, a terminal device of a mobile communication system is provided including a base station device and a terminal device performing radio communication with the base station device, the terminal device including: a radio communication unit configured to perform uplink transmission to the base station device using connection parameter information of uplink transmission to the base station device in an RRC_CONNECTED state in an RRC_INACTIVE state to which the RRC_CONNECTED state has transitioned in a case in which the control signal causing a transition from the RRC_CONNECTED state to the RRC_INACTIVE state has been received from the base station device.

(10) According to one aspect of the present invention, there is provided a base station device of a mobile communication system including the base station device and a terminal device performing radio communication with the base station device, the base station device including: a radio communication unit configured to transmit a control signal causing a transition from an RRC_CONNECTED state to an RRC_INACTIVE state to the terminal device and perform uplink reception from the terminal device that is in the RRC INACTIVE state that has transitioned from the RRC_CONNECTED state using connection parameter information of the uplink reception from the terminal device in the RRC_CONNECTED state.

(11) According to one aspect of the present invention, a communication method of a mobile communication system is provided including a base station device and a terminal device configured to perform radio communication with the base station device, the communication method including: a control signal transmission step of transmitting a control signal for causing a transition from an RRC_CONNECTED state to an RRC_INACTIVE state and including connection parameter information to the terminal device by using the base station device; an uplink transmission step of performing uplink transmission to the base station device using the connection parameter information included in the control signal in the RRC_INACTIVE state to which the RRC_CONNECTED state has transitioned in a case in which the control signal has been received by using the terminal device; and an uplink reception step of performing uplink reception from the terminal device that is in the RRC_INACTIVE state, to which the RRC_CONNECTED state has transitioned, using the connection parameter information included in the control signal by using the base station device.

(12) According to one aspect of the present invention, a communication method of a mobile communication system is provided including a base station device and a terminal device configured to perform radio communication with the base station device, the communication method including: a control signal transmission step of transmitting a control signal for causing a transition from an RRC_CONNECTED state to an RRC_INACTIVE state to the terminal device by using the base station device; an uplink transmission step of performing uplink transmission to the base station device using connection parameter information of uplink transmission to the base station device performed in the RRC_CONNECTED state in the RRC_INACTIVE state to which the RRC_CONNECTED state has transitioned in a case in which the control signal has been received by using the terminal device; and an uplink reception step of performing uplink reception from the terminal device that is in the RRC_INACTIVE state, to which the RRC_CONNECTED state has transitioned, using connection parameter information of uplink reception from the terminal device in the RRC_CONNECTED state by using the base station device.

(13) According to one aspect of the present invention, a computer program for causing a computer of a terminal device of a mobile communication system is provided including a base station device and the terminal device configured to perform radio communication with the base station device to execute: an uplink transmission step of performing uplink transmission to the base station device using connection parameter information included in a control signal in an RRC_INACTIVE state to which an RRC_CONNECTED state has transitioned in a case in which the control signal causing a transition from the RRC_CONNECTED state to the RRC_INACTIVE state and including the connection parameter information has been received from the base station device.

(14) According to one aspect of the present invention, a computer program for causing a computer of a base station device of a mobile communication system is provided including the base station device and a terminal device configured to perform radio communication with the base station device to execute: a control signal transmission step of transmitting a control signal for causing a transition from an RRC_CONNECTED state to an RRC_INACTIVE state and including connection parameter information to the terminal device; and an uplink reception step of performing uplink reception from the terminal device that is in the RRC_INACTIVE state, to which the RRC_CONNECTED state has transitioned, using the connection parameter information included in the control signal.

(15) According to one aspect of the present invention, a computer program for causing a computer of a terminal device of a mobile communication system is provided including a base station device and the terminal device configured to perform radio communication with the base station device to execute: an uplink transmission step of performing uplink transmission to the base station device using connection parameter information of uplink transmission to the base station device performed in an RRC_CONNECTED state in an RRC_INACTIVE state to which the RRC_CONNECTED state has transitioned in a case in which a control signal causing a transition from the RRC_CONNECTED state to the RRC_INACTIVE state has been received from the base station device.

(16) According to one aspect of the present invention, a computer program for causing a computer of a base station device of a mobile communication system is provided including the base station device and a terminal device configured to perform radio communication with the base station device to execute: a control signal transmission step of transmitting a control signal for causing a transition from an RRC_CONNECTED state to an RRC INACTIVE state to the terminal device; and an uplink reception step of performing uplink reception from the terminal device that is in the RRC_INACTIVE state, to which the RRC_CONNECTED state has transitioned, using connection parameter information used for uplink reception from the terminal device in the RRC_CONNECTED state.

Advantageous Effects of the Invention

According to the present invention, an effect of enabling a terminal device that is in the RRC_INACTIVE state to perform uplink transmission to a base station device is obtained.

DESCRIPTION OF EMBODIMENTS

Hereinafter, embodiments of the present invention will be described with reference to the drawings.

Figure 1:
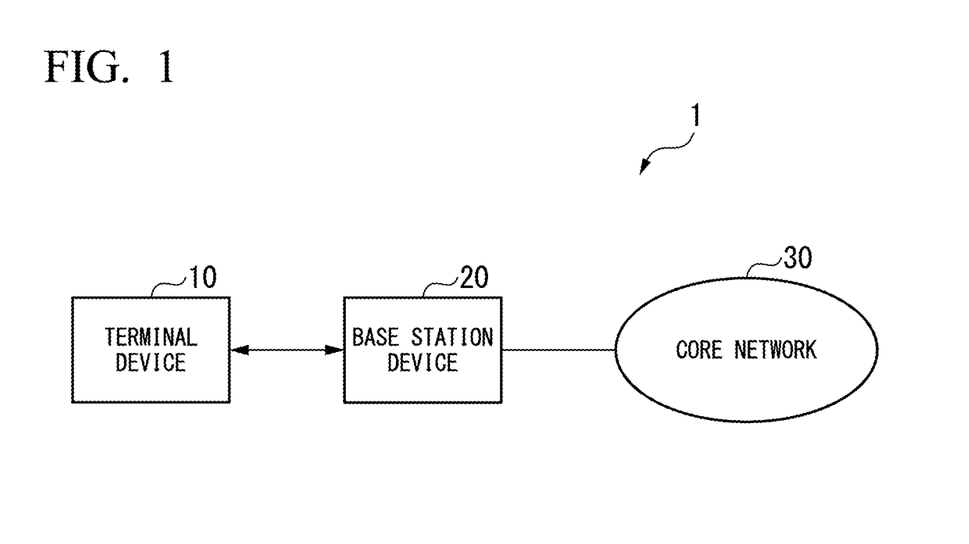
FIG. 1 is a block diagram illustrating a mobile communication system according to an embodiment.

FIG. 1 is a block diagram illustrating a schematic configuration example of a mobile communication system according to an embodiment.

For example, the mobile communication system 1 illustrated in FIG. 1 may be an LTE system or a 5G system.

In FIG. 1, a terminal device 10 performs radio communication with a base station device 20. The base station device 20 is connected to a core network 30 and communicates therewith. The terminal device 10 communicates with the core network 30 through the base station device 20.

Figure 2:
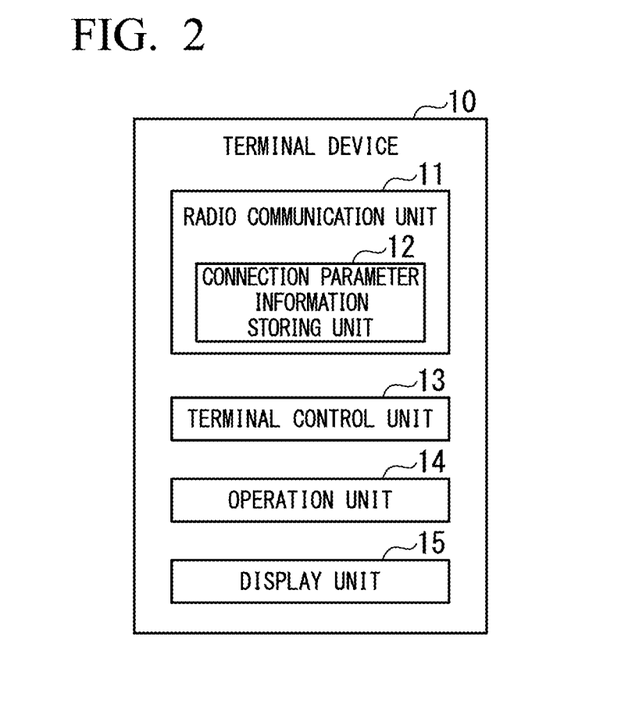
FIG. 2 is a block diagram illustrating a terminal device according to an embodiment.

FIG. 2 is a block diagram illustrating a schematic configuration example of a terminal device according to this embodiment. In FIG. 2, the terminal device 10 includes a radio communication unit 11, a terminal control unit 13, an operation unit 14, and a display unit 15. The radio communication unit 11 includes a connection parameter information storing unit 12.

The radio communication unit 11 performs radio communication with the base station device 20. The connection parameter information storing unit 12 stores connection parameter information. The radio communication unit 11 performs transmission of an uplink signal (uplink transmission) to the base station device 20 using the connection parameter information stored in the connection parameter information storing unit 12. An uplink is a link directed from the terminal device 10 to the base station device 20. A downlink is a link directed from the base station device 20 to the terminal device 10.

A signal that is transmitted as an uplink from the terminal device 10 to the base station device 20 may be a user data signal (a User-plane (U-plane) signal) or a control signal (Control-plane (C-plane) signal).

The connection parameter information, for example, is transmission timing information, physical resource information, modulation and coding scheme information, transmission power information, and the like. The power transmission timing information is information that includes a slot period and an offset value from a downlink frame. The physical resource information is information that includes symbol positions and frequency positions of transmission resources. The modulation and coding scheme information is information that includes a modulation and coding scheme (MCS) and a channel quality indicator (CQI). The MCS is information that represents a modulation scheme and a coding rate.

The terminal control unit 13 controls the terminal device 10. The operation unit 14, for example, is configured from an input device such as numerical keys and performs data input according to a user operation. The display unit 15, for example, is configured from a display device such as a liquid crystal display device and displays data. The terminal device 10 may include a touch panel that can perform both input of data and display of data.

As the terminal device 10, a mobile communication terminal device such as a smartphone, a tablet-type computer device (tablet PC), or the like may be used.

Figure 3:
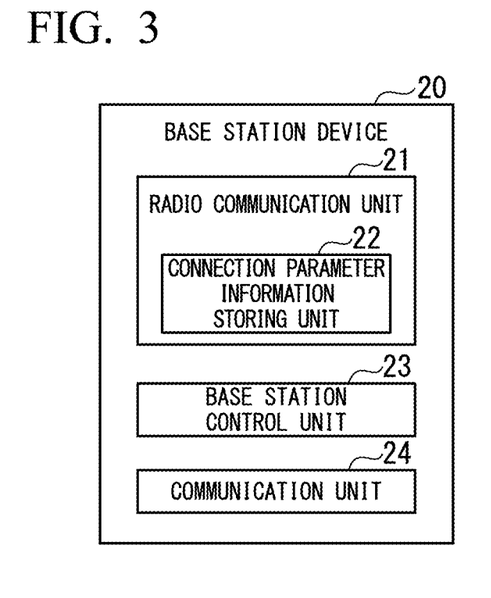
FIG. 3 is a block diagram illustrating a base station device according to an embodiment.

FIG. 3 is a block diagram illustrating a schematic configuration example of a base station device according to this embodiment. In the example illustrated in FIG. 3, the base station device 20 includes a radio communication unit 21, a base station control unit 23, and a communication unit 24. The radio communication unit 21 includes a connection parameter information storing unit 22.

The radio communication unit 21 performs radio communication with the terminal device 10. The connection parameter information storing unit 22 stores connection parameter information. The radio communication unit 21 performs reception of an uplink signal (uplink reception) from the terminal device 10 using the connection parameter information stored in the connection parameter information storing unit 22.

The base station control unit 23 controls the base station device 20. The communication unit 24 communicates with the core network 30.

Next, an example of a communication method according to this embodiment will be described.

EXAMPLE 1 OF COMMUNICATION METHOD

Figure 4:
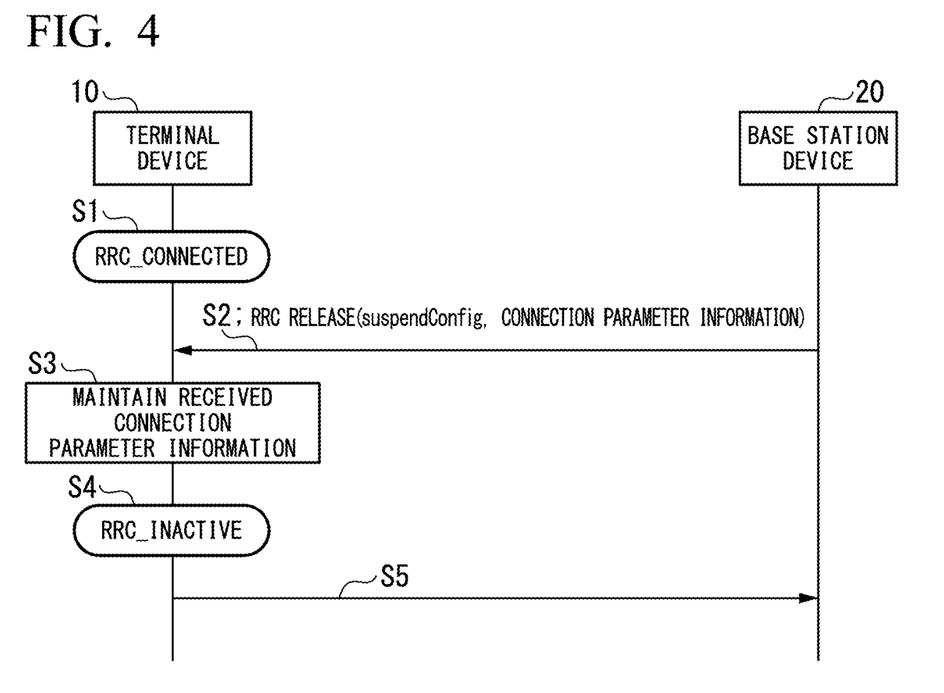
FIG. 4 is a sequence diagram illustrating the sequence of Example 1 of a communication method according to an embodiment.

Example 1 of the communication method according to this embodiment will be described with reference to FIG. 4. FIG. 4 is a sequence diagram illustrating the sequence of Example 1 of the communication method according to an embodiment.

(Step S1)
The terminal device 10 is in the RRC_CONNECTED state. The terminal device 10 stores the connection parameter information of the RRC_CONNECTED state in the connection parameter information storing unit 12.

The radio communication unit 11 of the terminal device 10 in the RRC_CONNECTED state performs uplink transmission to the base station device 20 using the connection parameter information of the RRC_CONNECTED state that is stored in the connection parameter information storing unit 12.

The radio communication unit 21 of the base station device 20 stores the connection parameter information of the RRC_CONNECTED state in the connection parameter information storing unit 22. The radio communication unit 21 performs uplink reception from the terminal device 10 that is in the RRC_CONNECTED state using the connection parameter information of the RRC_CONNECTED state that is stored in the connection parameter information storing unit 22.

(Step S2)
The radio communication unit 21 of the base station device 20 transmits an "RRC release" signal to the terminal device 10. This "RRC release" signal is a signal that includes "suspendConfig" and connection parameter information. The "RRC release" signal including "suspendConfig" is a control signal causing a transition from the RRC_CONNECTED state to the RRC_INACTIVE state. The connection parameter information added to the "RRC release" signal including "suspendConfig" is connection parameter information of the RRC_INACTIVE state to which the RRC_CONNECTED state has transitioned in accordance with an "RRCrelease" signal including the "suspendConfig". The radio communication unit 21 stores the connection parameter information of the RRC_INACTIVE state included in the "RRC release" signal including "suspendConfig" in the connection parameter information storing unit 22.

(Step S3)
When the "RRC release" signal including "suspendConfig" and the connection parameter information is received from the base station device 20, the radio communication unit 11 of the terminal device 10 stores the connection parameter information of the RRC_INACTIVE state included in the received "RRCrelease" signal in the connection parameter information storing unit 12. In addition, the radio communication unit 11 deletes the connection parameter information of the RRC_CONNECTED state from the connection parameter information storing unit 12.

(Step S4)
The terminal device 10 transitions to the RRC_INACTIVE state in accordance with the "RRC release" signal including "suspendConfig" and the connection parameter information received from the base station device 20.

(Step S5)
The radio communication unit 11 of the terminal device 10 that is in the RRC_INACTIVE state performs uplink transmission to the base station device 20 using the connection parameter information of the RRC_INACTIVE state that is stored in the connection parameter information storing unit 12. The radio communication unit 21 of the base station device 20 performs uplink reception from the terminal device 10 that is in the RRC_INACTIVE state using the connection parameter information of the RRC_INACTIVE state that is stored in the connection parameter information storing unit 22.

According to Example 1 of the communication method described above, the terminal device 10 that is in the RRC_INACTIVE state can perform uplink transmission to the base station device 20 using the connection parameter information included in the "RRC release" signal including "suspendConfig" received from the base station device 20.

EXAMPLE 2 OF COMMUNICATION METHOD

Figure 5:
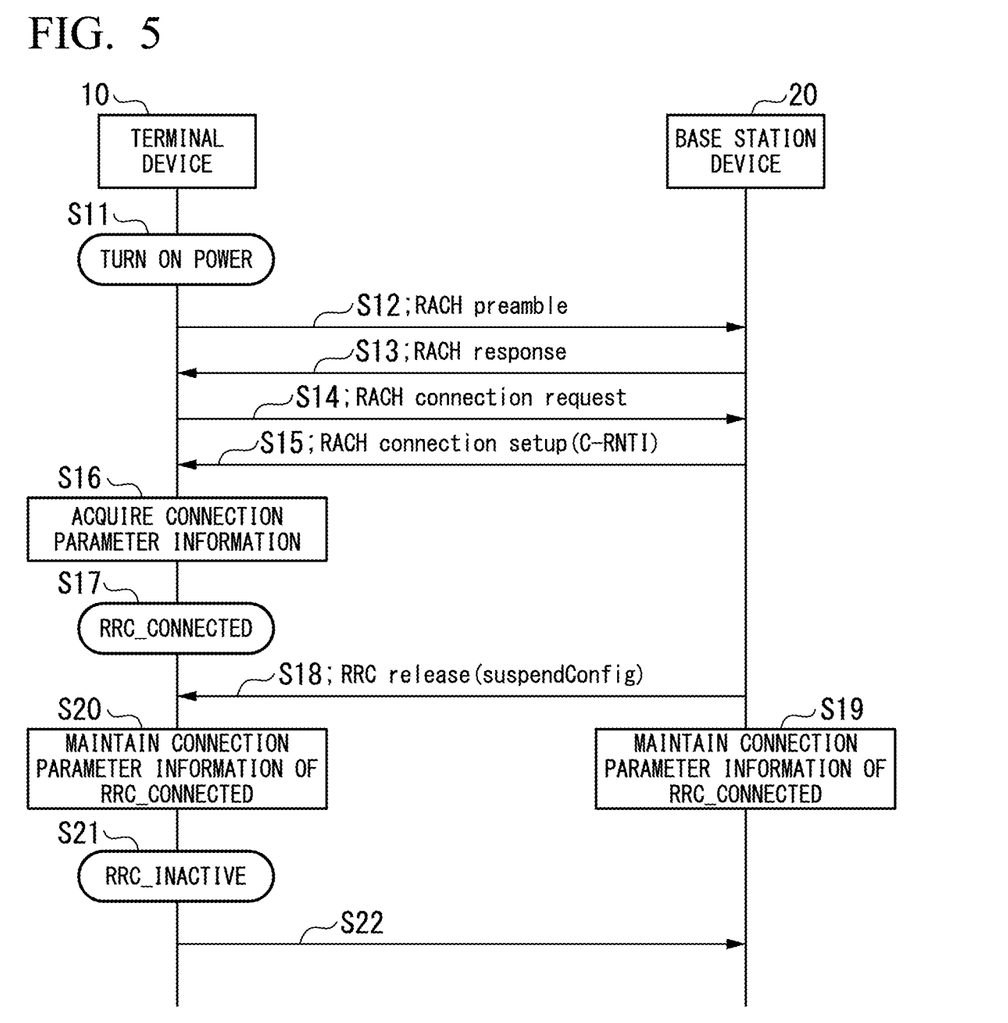
FIG. 5 is a sequence diagram illustrating the sequence of Example 2 of the communication method according to an embodiment.

Example 2 of the communication method according to this embodiment will be described with reference to FIG. 5. FIG. 5 is a sequence diagram illustrating the sequence of Example 2 of the communication method according to an embodiment. In the example illustrated in FIG. 5, as one example of a sequence in which the terminal device 10 transitions to the RRC_CONNECTED state, a sequence of initial connection executed after the terminal device 10 is turned on is illustrated. In addition, the sequence in which the terminal device 10 transitions to the RRC_CONNECTED state may be a sequence other than the sequence of the initial connection.

(Step S11)
The terminal device 10 is turned on. Next, the radio communication unit 11 of the terminal device 10 executes Steps S12 to S15 as the sequence of initial connection.

(Step S12)
The radio communication unit 11 of the terminal device 10 transmits a "RACH preamble" signal to the base station device 20.

(Step S13)
The radio communication unit 21 of the base station device 20 transmits a "RACH response" signal to the terminal device 10.

(Step S14)
The radio communication unit 11 of the terminal device 10 transmits an "RACH connection request" signal to the base station device 20.

(Step S15)

The radio communication unit 21 of the base station device 20 transmits an "RACH connection setup (C-RNTI)" signal to the terminal device 10.

(Step S16)

The radio communication unit 11 of the terminal device 10 acquires connection parameter information of the RRC_CONNECTED state in accordance with the sequence of the initial connection. The radio communication unit 11 stores the acquired connection parameter information of the RRC_CONNECTED state in the connection parameter information storing unit 12.

(Step S17)

The terminal device 10 transitions to the RRC_CONNECTED state. The radio communication unit 11 of the terminal device 10 that is in the RRC_CONNECTED state performs uplink transmission to the base station device 20 using the connection parameter information of the RRC_CONNECTED state that is stored in the connection parameter information storing unit 12.

The radio communication unit 21 of the base station device 20 stores the connection parameter information of the RRC_CONNECTED state in the connection parameter information storing unit 22. The radio communication unit 21 performs uplink reception from the terminal device 10 that is in the RRC_CONNECTED state using the connection parameter information of the RRC_CONNECTED state that is stored in the connection parameter information storing unit 22.

(Step S18)

The radio communication unit 21 of the base station device 20 transmits an "RRC release" signal including "suspendConfig" to the terminal device 10.

(Step S19)

The radio communication unit 21 of the base station device 20 continuously maintains the connection parameter information of the RRC_CONNECTED state, which has been stored in the connection parameter information storing unit 22, in the connection parameter information storing unit 22.

(Step S20)

When an "RRC release" signal including "suspendConfig" is received from the base station device 20, the radio communication unit 11 of the terminal device 10 continuously maintains the connection parameter information of the RRC_CONNECTED state, which has been stored in the connection parameter information storing unit 12, in the connection parameter information storing unit 12.

(Step S21)

The terminal device 10 transitions to the RRC_INACTIVE state in accordance with the "RRC release" signal including "suspendConfig" received from the base station device 20.

(Step S22)

The radio communication unit 11 of the terminal device 10 that is in the RRC_INACTIVE state performs uplink transmission to the base station device 20 using the connection parameter information of the RRC_CONNECTED state that is stored in the connection parameter information storing unit 12. The radio communication unit 21 of the base station device 20 performs uplink reception from the terminal device 10 that is in the RRC_INACTIVE state using the connection parameter information of the RRC_CONNECTED state that is stored in the connection parameter information storing unit 22.

According to Example 2 of the communication method described above, the terminal device 10 that has transitioned from the RRC_CONNECTED state to the RRC_INACTIVE state can perform uplink transmission to the base station device using the connection parameter information of uplink transmission to the base station device in the RRC_CONNECTED state.

In addition, Example 1 and Example 2 of the communication method described above may be combined. In a case in which Example 1 and Example 2 of the communication method are combined, when an "RRC release" signal including "suspendConfig" and the connection parameter information is transmitted from the base station device 20 to the terminal device 10, connection parameter information similar to that of Example 1 of the communication method described above is set. On the other hand, when an "RRC release" signal including "suspendConfig" transmitted from the base station device 20 to the terminal device 10 does not include connection parameter information, connection parameter information similar to that of Example 2 of the communication method described above is set.

EXAMPLE 3 OF COMMUNICATION METHOD

Figure 6:
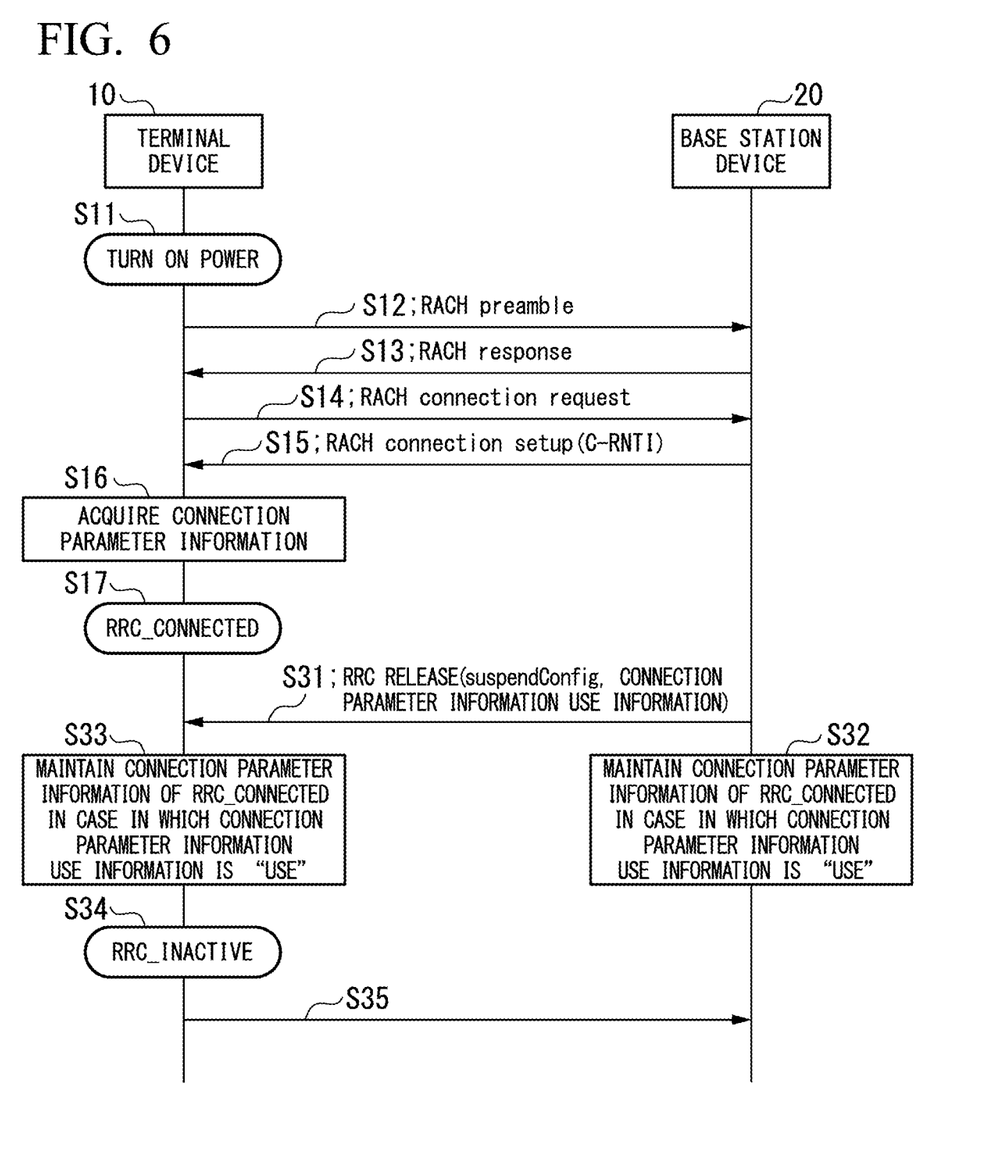
FIG. 6 is a sequence diagram illustrating the sequence of Example 3 of the communication method according to an embodiment.

Example 3 of the communication method according to this embodiment will be described with reference to FIG. 6. FIG. 6 is a sequence diagram illustrating the sequence of Example 3 of the communication method according to this embodiment. In FIG. 6, the same reference signs are respectively assigned to steps corresponding to the steps of FIG. 5. In the example illustrated in FIG. 6, similar to the example illustrated in FIG. 5, as one example of the sequence in which the terminal device 10 transitions to the RRC_CONNECTED state, a sequence of initial connection executed after the terminal device 10 is turned on is illustrated. The sequence in which the terminal device 10 transitions to the RRC_CONNECTED state may be other than the sequence of the initial connection.

Steps S11 to S17 illustrated in FIG. 6 are executed. Steps S11 to S17 are the same as those of Example 2 of the communication method illustrated in FIG. 5 described above. Next, Step S31 is executed.

(Step S31)

The radio communication unit 21 of the base station device 20 transmits an "RRC release" signal including "suspendConfig" and connection parameter information use information to the terminal device 10. The connection parameter information use information is information that represents whether or not connection parameter information of the RRC_CONNECTED state is to be used.

(Step S32)

In a case in which the connection parameter information use information of the "RRC release" signal transmitted to the terminal device 10 indicates that connection parameter information of the RRC_CONNECTED state is to be used, the radio communication unit 21 of the base station device 20 continuously maintains the connection parameter information of the RRC_CONNECTED state, which has been stored in the connection parameter information storing unit 22, in the connection parameter information storing unit 22. On the other hand, in a case in which the connection parameter information use information of the "RRC release" signal transmitted to the terminal device 10 does not indicate that connection parameter information of the RRC_CONNECTED state is to be used, the radio communication unit 21 of the base station device 20 deletes the connection parameter information of the RRC_CONNECTED state from the connection parameter information storing unit 22.

(Step S33)

In a case in which an "RRC release" signal including "suspendConfig" and the connection parameter information use information has been received from the base station device 20, when the connection parameter information use information of the "RRC release" signal indicates that the connection parameter information of the RRC_CONNECTED state is to be used, the radio communication unit 11 of the terminal device 10 continuously maintains the connection parameter information of the RRC_CONNECTED state, which has been stored in the connection parameter information storing unit 12, in the connection parameter information storing unit 12. On the other hand, when the connection parameter information use information of the "RRC release" signal does not indicate that the connection parameter information of the RRC_CONNECTED state is to be used, the radio communication unit 11 of the terminal device 10 deletes the connection parameter information of the RRC_CONNECTED state from the connection parameter information storing unit 12.

(Step S34)

The terminal device 10 transitions to the RRC_INACTIVE state in accordance with the "RRC release" signal including "suspendConfig" and the connection parameter information use information received from the base station device 20.

(Step S35)

The radio communication unit 11 of the terminal device 10 that is in the RRC_INACTIVE state performs uplink transmission to the base station device 20 using the connection parameter information of the RRC_CONNECTED state that is stored in the connection parameter information storing unit 12. The radio communication unit 21 of the base station device 20 performs uplink reception from the terminal device 10 that is in the RRC_INACTIVE state using the connection parameter information of the RRC_CONNECTED state that is stored in the connection parameter information storing unit 22.

According to Example 3 of the communication method described above, in a case in which the connection parameter information use information "use" has been received from the base station device 20, the terminal device 10 that has transitioned from the RRC_CONNECTED state to the RRC_INACTIVE state can perform uplink transmission to the base station device using the connection parameter information of the uplink transmission to the base station device in the RRC_CONNECTED state. In addition, the base station device 20 can instruct the terminal device 10 that is caused to transition from the RRC_CONNECTED state to the RRC_INACTIVE state of whether or not connection parameter information of the uplink transmission to the base station device in the RRC_CONNECTED state is to be used using the connection parameter information use information.

Example 1 and Example 3 of the communication method described above may be combined. In a case in which Example 1 and Example 3 of the communication method are combined, when the "RRC release" signal including "suspendConfig" and the connection parameter information is transmitted from the base station device 20 to the terminal device 10, connection parameter information similar to that of Example 1 of the communication method described above is set. On the other hand, when an "RRC release" signal including "suspendConfig" and the connection parameter information use information is transmitted from the base station device 20 to the terminal device 10, connection parameter information similar to that of Example 3 of the communication method described above is set.

EXAMPLE 4 OF COMMUNICATION METHOD

Figure 7:
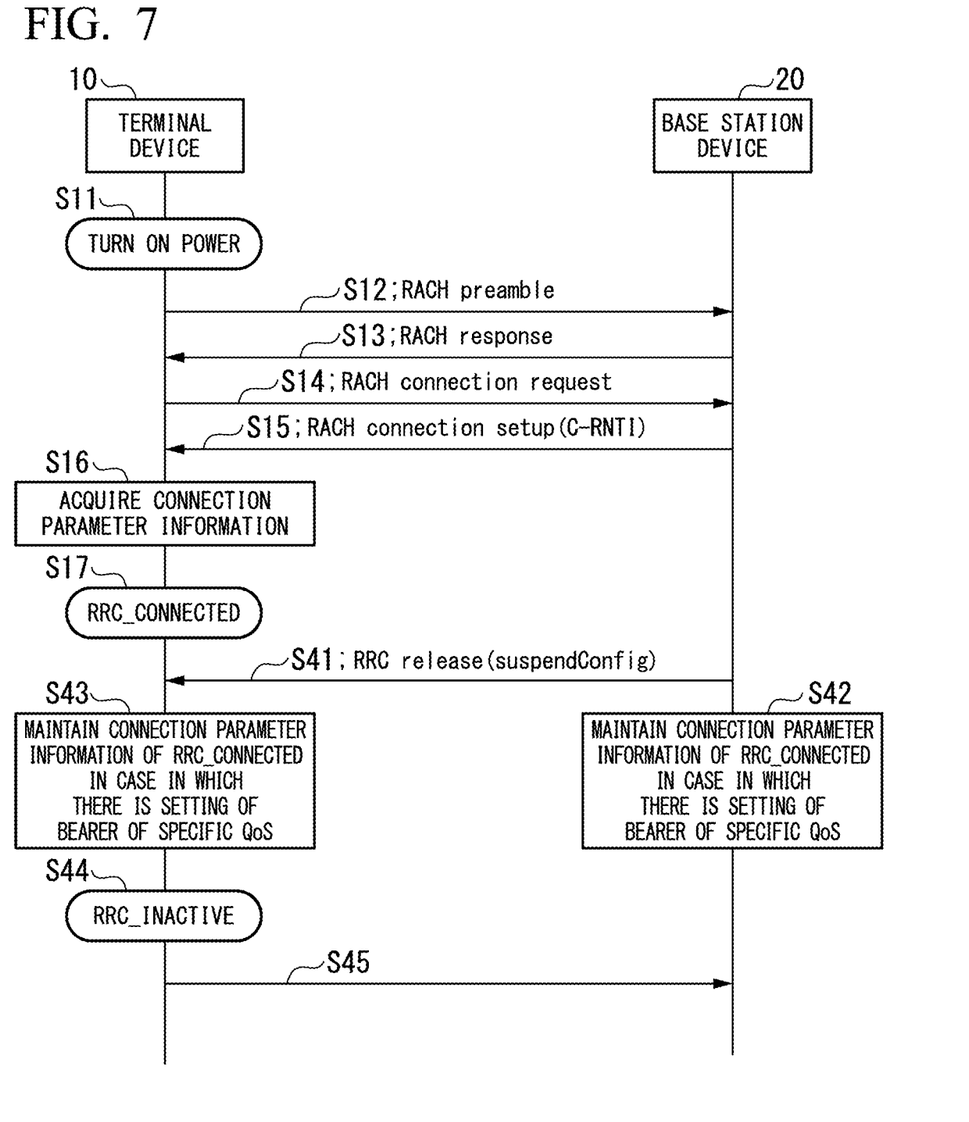
FIG. 7 is a sequence diagram illustrating the sequence of Example 4 of the communication method according to an embodiment.

Example 4 of the communication method according to this embodiment will be described with reference to FIG. 7. FIG. 7 is a sequence diagram illustrating the sequence of Example 4 of the communication method according to this embodiment. In FIG. 7, the same reference signs are respectively assigned to steps corresponding to the steps of FIG. 5. In the example illustrated in FIG. 7, similar to the example illustrated in FIG. 5, as one example of a sequence in which the terminal device 10 transitions to the RRC_CONNECTED state, a sequence of initial connection executed after the terminal device 10 is turned on is illustrated. The sequence in which the terminal device 10 transitions to the RRC_CONNECTED state may be a sequence other than the sequence of the initial connection.

Steps S11 to S17 illustrated in FIG. 7 are executed. Steps S11 to S17 are the same as those of Example 2 of the communication method illustrated in FIG. 5 described above. Next, Step S41 is executed.

(Step S41)

The radio communication unit 21 of the base station device 20 transmits an "RRC release" signal including "suspendConfig" to the terminal device 10.

(Step S42)

The radio communication unit 21 of the base station device 20 maintains information indicating whether or not a bearer in which a specific quality of service (QoS) is set (hereinafter, referred to as a specific QoS bearer) is established between the terminal device 10 and the core network 30. In a case in which a specific QoS bearer has been established between the terminal device 10 and the core network 30, the radio communication unit 21 of the base station device 20 continuously maintains connection parameter information of the RRC_CONNECTED state, which has been stored in the connection parameter information storing unit 22, in the connection parameter information storing unit 22. On the other hand, in a case in which the specific QoS bearer has not been established between the terminal device 10 and the core network 30, the radio communication unit 21 of the base station device 20 deletes the connection parameter information of the RRC_CONNECTED state from the connection parameter information storing unit 22.

For example, a node of the core network 30 that is an opponent for which a specific QoS bearer is established by the terminal device 10 is a serving gateway (S-GW) of a core network of an LTE system, a user plane function (UPF) of a core network of a 5G system, or the like. In the LTE system, a QoS is represented by a QoS class identifier (QCI). In the 5G system, a QoS is represented by 5G QoS identifier (5QI).

(Step S43)

The radio communication unit 11 of the terminal device 10 maintains information indicating whether or not a specific QoS bearer has been established between its own terminal device 10 and the core network 30. In a case in which an "RRC release" signal including "suspendConfig" has been received from the base station device 20, when a specific QoS bearer is established between its own terminal device 10 and the core network 30, the radio communication unit 11 of the terminal device 10 continuously maintains connection parameter information of the RRC_CONNECTED state, which has been stored in the connection parameter information storing unit 12, in the connection parameter information storing unit 12. On the other hand, in a case in which an "RRC release" signal including "suspendConfig" has been received from the base station device 20, when a specific QoS bearer is not established between its own terminal device 10 and the core network 30, the radio communication unit 11 of the terminal device 10 deletes the connection parameter information of the RRC_CONNECTED state from the connection parameter information storing unit 12.

(Step S44)

The terminal device 10 transitions to the RRC_INACTIVE state in accordance with the "RRC release" signal including "suspendConfig" received from the base station device 20.

(Step S45)

The radio communication unit 11 of the terminal device 10 that is in the RRC_INACTIVE state performs uplink transmission to the base station device 20 using the connection parameter information of the RRC_CONNECTED state that is stored in the connection parameter information storing unit 12. The radio communication unit 21 of the base station device 20 performs uplink reception from the terminal device 10 that is in the RRC_INACTIVE state using the connection parameter information of the RRC_CONNECTED state that is stored in the connection parameter information storing unit 22.

According to Example 4 of the communication method described above, in a case in which a specific QoS bearer is established between its own terminal device 10 and the core network 30, the terminal device 10 that has transitioned from the RRC_CONNECTED state to the RRC_INACTIVE state can perform uplink transmission to the base station device using the connection parameter information of the uplink transmission to the base station device in the RRC_CONNECTED state.

Example 1 and Example 4 of the communication method described above may be combined. In a case in which Example 1 and Example 4 of the communication method are combined, when the "RRC release" signal including "suspendConfig" and the connection parameter information is transmitted from the base station device 20 to the terminal device 10, connection parameter information similar to that of Example 1 of the communication method described above is set. On the other hand, when an "RRC release" signal including "suspendConfig" transmitted from the base station device 20 to the terminal device 10 does not include connection parameter information, connection parameter information similar to that of Example 4 of the communication method described above is set.

EXAMPLE 5 OF COMMUNICATION METHOD

Figure 8:
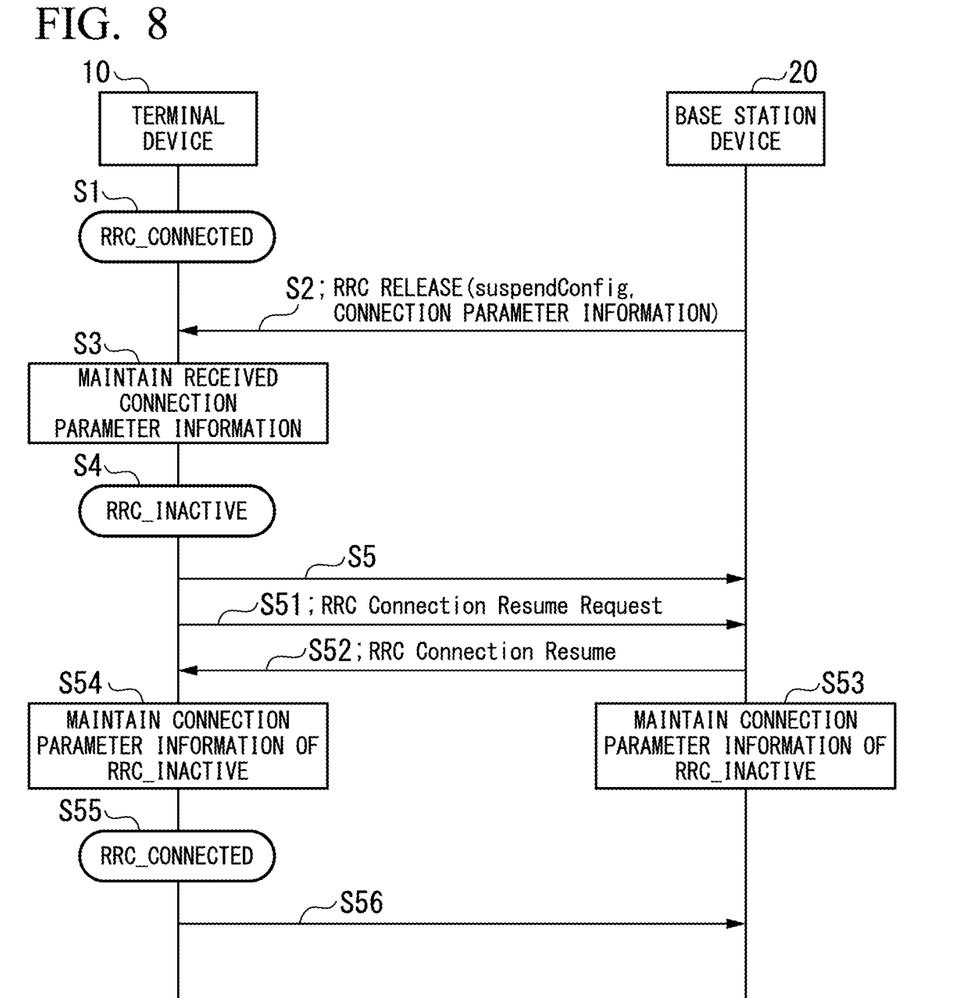
FIG. 8 is a sequence diagram illustrating the sequence of Example 5 of the communication method according to an embodiment.

Example 5 of the communication method according to this embodiment will be described with reference to FIG. 8. FIG. 8 is a sequence diagram illustrating the sequence of Example 5 of the communication method according to this embodiment. In FIG. 8, the same reference signs are respectively assigned to steps corresponding to the steps of FIG. 4.

Steps S1 to S5 illustrated in FIG. 8 are executed. Steps S1 to S5 are the same as those of Example 1 of the communication method illustrated in FIG. 4 described above. Next, Steps S51 and S52 are executed. Steps S51 and S52 are one example of the sequence in which the terminal device 10 that is in the RRC_INACTIVE state transitions to the RRC_CONNECTED state.

(Step S51)

The radio communication unit 11 of the terminal device 10 transmits an "RRC Connection Resume Request" signal to the base station device 20.

(Step S52)

The radio communication unit 21 of the base station device 20 transmits an "RRC Connection Resume" signal to the terminal device 10.

(Step S53)

The radio communication unit 21 of the base station device 20 continuously maintains the connection parameter information of the RRC_INACTIVE state, which has been stored in the connection parameter information storing unit 22, in the connection parameter information storing unit 22.

(Step S54)

The radio communication unit 11 of the terminal device 10 continuously maintains the connection parameter information of the RRC_INACTIVE state, which has been stored in the connection parameter information storing unit 12, in the connection parameter information storing unit 12.

(Step S55)

The terminal device 10 transitions to the RRC_CONNECTED state in accordance with an "RRC Connection Resume" signal received from the base station device 20.

(Step S56)

The radio communication unit 11 of the terminal device 10 that is in the RRC_CONNECTED state performs uplink transmission to the base station device 20 using the connection parameter information of the RRC_INACTIVE state that is stored in the connection parameter information storing unit 12. The radio communication unit 21 of the base station device 20 performs uplink reception from the terminal device 10 that is in the RRC_CONNECTED state using the connection parameter information of the RRC_INACTIVE state that is stored in the connection parameter information storing unit 22.

According to Example 5 of the communication method described above, the terminal device 10 that has transitioned from the RRC_INACTIVE state to the RRC_CONNECTED state can transmit an uplink to the base station device using the connection parameter information of the uplink transmission to the base station device in the RRC_INACTIVE state. In accordance with this, in the sequence in which the terminal device 10 transitions from the RRC_INACTIVE state to the RRC_CONNECTED state, a sequence in which the terminal device 10 acquires connection parameter information used in the RRC_CONNECTED state can be omitted.

Example 5 of the communication method described above may be combined with Example 2, Example 3, or Example 4 of the communication method described above.

In Example 5 of the communication method described above, an example in which the terminal device 10, which has transitioned from the RRC_INACTIVE state to the RRC_CONNECTED state, continuously maintains the connection parameter information of the RRC_INACTIVE state in the connection parameter information storing unit 12 has been illustrated. However, by using another method, the terminal device 10 that has transitioned from the RRC_INACTIVE state to the RRC_CONNECTED state may set connection parameter information used for uplink transmission to the base station device in the terminal device 10.

For example, the radio communication unit 21 of the base station device 20 transmits an "RRC Connection Resume" signal including connection parameter information to the terminal device 10. The radio communication unit 11 of the terminal device 10 stores the connection parameter information of the "RRC Connection Resume" signal in the connection parameter information storing unit 12. In addition, the radio communication unit 11 of the terminal device 10 deletes the connection parameter information of the RRC_INACTIVE state from the connection parameter information storing unit 12. The radio communication unit 11 of the terminal device 10 that has transitioned from the RRC_INACTIVE state to the RRC_CONNECTED state performs uplink transmission to the base station device 20 using the connection parameter information of the "RRC Connection Resume" signal stored in the connection parameter information storing unit 12. The radio communication unit 21 of the base station device 20 stores the connection parameter information of the "RRC Connection Resume" signal in the connection parameter information storing unit 22 and performs uplink reception from the terminal device 10 that is in the RRC_CONNECTED state using the connection parameter information of the "RRC Connection Resume" signal.

According to the embodiment described above, there is an advantage that the terminal device that is in the RRC_INACTIVE state can perform uplink transmission to the base station device.

In addition, the base station device can recognize connection parameter information used for the uplink transmission by the terminal device that is in the RRC_INACTIVE state and thus can perform uplink reception from the terminal device that is in the RRC_INACTIVE state. In addition, a signal that is transmitted as an uplink from the terminal device that is in the RRC_INACTIVE state can be prevented from causing bad influences on signals of other synchronous terminals.

This embodiment may be applied to both synchronous uplink transmission and an asynchronous uplink transmission to the base station device performed by the terminal device that is in the RRC_INACTIVE state.

In addition, the radio communication unit 11 of the terminal device 10 may adjust a transmission power value of connection parameter information used for uplink transmission to the base station device 20 on the basis of a signal received from the base station device 20 in the RRC_INACTIVE state. For example, the radio communication unit 11 of the terminal device 10 observes a signal that is periodically transmitted from the base station device 20, calculates a path loss on the basis of a result of the observation, and changes a transmission power value of the connection parameter information on the basis of the path loss that is the result of the calculation.

As the connection parameter information used by the terminal device in the RRC_INACTIVE state, connection parameter information that had been used in the past may be used, or connection parameter information set in advance may be used.

In addition, the connection parameter information of uplink transmission to the base station device from the terminal device in the RRC_INACTIVE state may be repeatedly used as connection parameter information of uplink transmission to the base station device in the next RRC_INACTIVE state.

As above, although the embodiment of the present invention has been described in detail with reference to the drawings, a specific configuration is not limited to this embodiment, and a design and the like in a range not departing from the concept of the present invention are included therein.

A computer program used for realizing the function of each device described above may be recorded on a computer-readable recording medium, and a computer system may be caused to read and execute the program recorded on this recording medium. The "computer system" described here may include an OS and hardware such as peripherals.

The "computer-readable recording medium" represents a writable nonvolatile memory such as a flexible disk, a magneto-optical disk, a ROM, or a flash memory, a portable medium such as a digital versatile disc (DVD), or a storage device such as a hard disk built into the computer system.

In addition, the "computer-readable recording medium" may include a medium storing a program for a predetermined time such as a volatile memory (for example, an internal dynamic random access memory (DRAM)) of a computer system serving as a server or a client in a case in which the program is transmitted through a network such as the Internet or a communication line such as a telephone line.

Furthermore, the program described above may be transmitted from a computer system storing the program in a storage device or the like to another computer system through a transmission medium or using transmission waves in a transmission medium. Here, the "transmission medium" transmitting the program represents a medium having a function of transmitting information such as a network (communication network) including the Internet and the like or a communication line including a telephone line.

In addition, the program described above may be used for realizing some of the functions described above.

Furthermore, the program described above may be a program realizing the functions described above by being combined with a program recorded in the computer system in advance, a so-called a differential file (differential program).

REFERENCE SIGNS LIST

1 Mobile communication system
10 Terminal device
11, 21 Radio communication unit
12, 22 Connection parameter information storing unit
13 Terminal control unit
14 Operation unit
15 Display unit
20 Base station device
23 Base station control unit
24 Communication unit
30 Core network

The invention claimed is:

1. A mobile communication system comprising:
a base station device; and
a terminal device, wherein the terminal device performs a radio communication with the base station device,
wherein the base station device transmits a control signal for causing a transition from an RRC_CONNECTED state to an RRC_INACTIVE state to the terminal device,
wherein the terminal device performs uplink transmission to the base station device using connection parameter information of the uplink transmission to the base station device in the RRC_CONNECTED state in the RRC_INACTIVE state to which the RRC_CONNECTED state has transitioned in a case in which the control signal has been received,
wherein the base station device performs uplink reception from the terminal device that is in the RRC_INACTIVE state to which the RRC_CONNECTED state has transitioned, using connection parameter information of the uplink reception from the terminal device in the RRC_CONNECTED state, and wherein the connection parameter information includes one of transmission timing information, physical resource information, modulation and coding scheme information, or transmission power information.

2. The mobile communication system according to claim 1, wherein the control signal includes connection parameter information use information that indicates whether or not the connection parameter information of the uplink transmission to the base station device in the RRC_CONNECTED state is to be used, wherein, when the connection parameter information use information of the control signal indicates that the connection parameter information of the RRC_CONNECTED state is to be used in a case in which the control signal has been received, the terminal device performs the uplink transmission to the base station device using the connection parameter information of the uplink transmission to the base station device in the RRC_CONNECTED state in the RRC_INACTIVE state to which the RRC_CONNECTED state has transitioned, and wherein, in a case in which the connection parameter information use information of the control signal transmitted to the terminal device indicates that the connection parameter information of the uplink reception from the terminal device in the RRC_CONNECTED state is to be used, the base station device performs the uplink reception from the terminal device that is in the RRC_INACTIVE state to which the RRC_CONNECTED state has transitioned using the connection parameter information of the uplink reception from the terminal device in the RRC_CONNECTED state.

3. The mobile communication system according to claim 1, wherein, when a bearer in which a specific QoS is set is established between the terminal device and a core network in a case in which the control signal has been received, the terminal device performs uplink transmission to the base station device using the connection parameter information of the uplink transmission to the base station device in the RRC_CONNECTED state in the RRC_INACTIVE state to which the RRC_CONNECTED state has transitioned, and wherein, in a case in which the bearer is established between the terminal device and the core network, the base station device performs uplink reception from the terminal device in the RRC_INACTIVE state to which the RRC_CONNECTED state has transitioned using the connection parameter information of the uplink reception from the terminal device in the RRC_CONNECTED state.

4. The mobile communication system according to claim 1, wherein, in the RRC_CONNECTED state to which the RRC_INACTIVE state has transitioned, the terminal device performs uplink transmission to the base station device using connection parameter information of the uplink transmission to the base station device in the RRC_INACTIVE state, and wherein the base station device performs uplink reception from the terminal device that is in the RRC_CONNECTED state to which the RRC_INACTIVE state has transitioned using connection parameter information of the uplink reception from the terminal device in the RRC_INACTIVE state.

5. The mobile communication system according to claim 1, wherein, in the RRC_INACTIVE state, the terminal device adjusts a transmission power value of the connection parameter information used for the uplink transmission to the base station device on the basis of a signal received from the base station device.

6. A terminal device of a mobile communication system including a base station device and the terminal device performing a radio communication with the base station device, the terminal device comprising:

a memory storing computer program instructions; and
a processor connected to the memory,
wherein the processor executes the computer program instructions to perform uplink transmission to the base station device using connection parameter information of the uplink transmission to the base station device in an RRC_CONNECTED state in an RRC_INACTIVE state to which the RRC_CONNECTED state has transitioned in a case in which the control signal causing a transition from the RRC_CONNECTED state to the RRC_INACTIVE state has been received from the base station device, and wherein the connection parameter information includes one of transmission timing information, physical resource information, modulation and coding scheme information, or transmission power information.

7. A base station device of a mobile communication system including the base station device and a terminal device performing a radio communication with the base station device, the base station device comprising:

a memory storing computer program instructions; and
a processor connected to the memory,
wherein the processor executes the computer program instructions to transmit a control signal causing a transition from an RRC_CONNECTED state to an RRC_INACTIVE state to the terminal device and perform uplink reception from the terminal device that is in the RRC_INACTIVE state that has transitioned from the RRC_CONNECTED state using connection parameter information of the uplink reception from the terminal device in the RRC_CONNECTED state, wherein the connection parameter information includes one of transmission timing information, physical resource information, modulation and coding scheme information, or transmission power information.

* * * * *